US011935454B2

(12) United States Patent
Xu et al.

(10) Patent No.: US 11,935,454 B2
(45) Date of Patent: Mar. 19, 2024

(54) BRIGHTNESS COMPENSATION METHOD OF CORRECTING BRIGHTNESS ACCORDING TO REGIONAL VIEWING ANGLE, AND DEVICE OF DISPLAY PANEL, READABLE STORAGE MEDIUM, AND DISPLAY DEVICE

(71) Applicant: SHENZHEN CHINA STAR OPTOELECTRONICS SEMICONDUCTOR DISPLAY TECHNOLOGY CO., LTD., Guangdong (CN)

(72) Inventors: Ling Xu, Guangdong (CN); Xinhong Chen, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/935,021

(22) Filed: Sep. 23, 2022

(65) Prior Publication Data

US 2024/0046837 A1 Feb. 8, 2024

(30) Foreign Application Priority Data

Aug. 2, 2022 (CN) ......................... 202210919025.6

(51) Int. Cl.
*G09G 3/20* (2006.01)

(52) U.S. Cl.
CPC ... *G09G 3/2007* (2013.01); *G09G 2320/0233* (2013.01); *G09G 2320/0626* (2013.01)

(58) Field of Classification Search
CPC ......... G09G 3/2007; G09G 2320/0233; G09G 2320/0626; G09G 2320/0693
See application file for complete search history.

(56) References Cited

U.S. PATENT DOCUMENTS

2007/0236517 A1* 10/2007 Kimpe ................. G09G 3/2092 345/690
2008/0247630 A1* 10/2008 Horiuchi ................ G09G 3/006 382/141

(Continued)

*Primary Examiner* — Xuemei Zheng
(74) *Attorney, Agent, or Firm* — PV IP PC; Wei Te Chung; Zhigang Ma

(57) ABSTRACT

A brightness compensation method and device of a display panel, a readable storage medium, and a display device are provided. A display panel is divided into at least one region. The region includes a to-be-corrected region. Wherein, the brightness compensation method includes: using a photographing component to photograph the display panel displaying a preset grayscale image; obtaining an image of the to-be-corrected region under a preset grayscale; obtaining brightness data of the to-be-corrected region, wherein the regional viewing angle is an included angle between a connection line of an optical center of a lens of the photographing component connecting to a center of the at least one region, and a normal of the display panel; correcting brightness of the to-be-corrected region to obtain corrected brightness data of the to-be-corrected region; and performing brightness compensation on the display panel according to the corrected brightness data of the to-be-corrected region.

10 Claims, 8 Drawing Sheets

(56) References Cited

U.S. PATENT DOCUMENTS

| | | | | |
|---|---|---|---|---|
| 2017/0270896 | A1* | 9/2017 | Cope | G09G 3/002 |
| 2019/0052872 | A1* | 2/2019 | Shyshkin | G01J 1/32 |
| 2020/0380909 | A1* | 12/2020 | Matoba | G09G 3/32 |

* cited by examiner

BRIGHTNESS COMPENSATION METHOD OF CORRECTING BRIGHTNESS ACCORDING TO REGIONAL VIEWING ANGLE, AND DEVICE OF DISPLAY PANEL, READABLE STORAGE MEDIUM, AND DISPLAY DEVICE

BACKGROUND OF INVENTION

Field of Invention

The present application relates to a field of display technology, and specifically to a brightness compensation method and device of a display panel, a readable storage medium, and a display device.

Description of Prior Art

In order to improve display effects, a variety of technologies required using photographing components are used in current liquid crystal display panels (LCDs), e.g., brightness compensation technology, compensation for insufficient charging technology, etc., which all need to extract brightness of the display panels to calculate appropriate compensation amount.

Taking the brightness compensation technology as an example, which processes are photographing a display region of a LCD, and dividing an obtained images of the LCD into N regions. When display brightness of a certain region being higher or lower than brightness of a reference region is detected, compensation data of a to-be-corrected region is calculated from the brightness of the reference region and the to-be-corrected region through a weighting manner, which is shown in formula (1):

$$W=n*\text{center}+(1-n)*\text{other} \tag{1}$$

Wherein, “center” and “other” respectively represent the brightness of the reference region of the display panel and the brightness of the to-be-corrected region, and “n” represents a weight of brightness of a center point.

Regarding compensation for insufficient charging technology, which compensation processes are mainly as follows: 1. making the display panel to simultaneously display a heavy-load image and a light-load image; 2. photographing the display region of the display panel to obtain an image; and 3. comparing brightness difference between the heavy-load image and the light-load image, and calculating compensation data of a region of the heavy-load image, so that the brightness of the heavy-load image can reach the brightness of the light-load image under compensation conditions.

From the above, it can be understood that in order to obtain accurate brightness compensation effect, accurately capturing the brightness of the display region of the display panel and calculating appropriate compensation amount are needed. In the prior art, cameras are used to obtain images of the display panels, and then brightness of the display regions of the display panels is obtained according to the images of the display panels. However, due to viewing angles of the cameras, a straight-line distance between the cameras and the display panels need to be more than three times of a thickness of the display panels to ensure that the images captured by the cameras do not be distorted. However, as sizes of the display panels are gradually increasing, due to limitation of factory sites, the straight-line distance between the cameras and the display panels cannot reach more than three times of the thickness of the display panels.

In this way, the images of the display panels collected by the cameras can be distorted, resulting in distortion of brightness of the images. Furthermore, performing brightness compensation on the display panels based on the distorted brightness can seriously affect brightness compensation effect to the display panels.

In currently provided solutions, a solution of using a plurality of cameras to ease the problem of image collection due to the viewing angles is provided, but using the plurality of cameras can lead to increment of production costs.

SUMMARY OF INVENTION

The present application provides a brightness compensation method and device of a display panel, a readable storage medium, and a display device to solve the problem that compensation effect is affected due to distortion of image brightness of the display panel.

The present application provides a brightness compensation method of a display panel. The display panel is divided into at least one region. The region includes a to-be-corrected region. The brightness compensation method includes:

using a photographing component to photograph the display panel displaying a preset grayscale image, obtaining an image of the to-be-corrected region under a preset grayscale;

obtaining brightness data of the to-be-corrected region through the image of the to-be-corrected region under the preset grayscale;

obtaining a regional viewing angle of the to-be-corrected region, wherein the regional viewing angle is an included angle between a connection line of an optical center of a lens of the photographing component connecting to a center of the region, and a normal of the display panel;

correcting brightness of the to-be-corrected region to obtain corrected brightness data of the to-be-corrected region according to the regional viewing angle of the to-be-corrected region; and performing brightness compensation on the display panel according to the corrected brightness data of the to-be-corrected region.

Optionally, in some embodiments of the present application, a shortest distance from the optical center of the lens of the photographing component to the display panel is less than a normal work distance of the photographing component.

Optionally, in some embodiments of the present application, the region further includes a reference region, and the photographing component is disposed directly in front of the reference region.

The brightness compensation method further includes:

obtaining an image of the reference region under the preset grayscale; and obtaining brightness data of the reference region through the image of the reference region under the preset grayscale.

The step of performing the brightness compensation on the display panel according to the corrected brightness data of the to-be-corrected region includes:

performing the brightness compensation on the display panel according to the brightness data of the reference region and the corrected brightness data of the to-be-corrected region.

Optionally, in some embodiments of the present application, the brightness compensation method further includes: establishing a display-feature regional-viewing-angle relational database of a mapping relation between display features of the region and the regional viewing angle.

The step of obtaining the regional viewing angle of the to-be-corrected region includes:

obtaining display features of the to-be-corrected region; and obtaining the regional viewing angle from the display-feature regional-viewing-angle relational database according to the display features of the to-be-corrected region.

Optionally, in some embodiments of the present application, the region further includes a reference region. The step of establishing the display-feature regional-viewing-angle relational database of the mapping relation between display features of the region and the regional viewing angle includes:

configuring a shortest distance from the optical center of the lens of the photographing component to the display panel to be a normal work distance;

controlling the reference region to display a viewing-angle confirmation image;

using the photographing component to photograph the display panel, and obtaining images of the reference region in different regional viewing angles;

obtaining display features of the image and corresponding regional viewing angles of the reference region in the different regional viewing angles; and establishing the display-feature regional-viewing-angle relational database of a mapping relation between display features of the region and the regional viewing angle.

Optionally, in some embodiments of the present application, the region includes a reference region, and the photographing component is disposed directly in front of the reference region. The step of obtaining the regional viewing angle of the to-be-corrected region includes:

obtaining at least two of a shortest distance from the optical center of the lens of the photographing component to the display panel, a distance from the optical center of the lens of the photographing component to a center of to-be-corrected region, or a distance from a center of the reference region to the center of the to-be-corrected region; and calculating the regional viewing angle of the to-be-corrected region according to the at least two of the shortest distance from the optical center of the lens of the photographing component to the display panel, the distance from the optical center of the lens of the photographing component to the center of to-be-corrected region, or the distance from the center of the reference region to the center of the to-be-corrected region.

Optionally, in some embodiments of the present application, the brightness compensation method further includes:

establishing a brightness-corrected-value regional-viewing-angle relational database of a mapping relation between the regional viewing angle of the region and a brightness correction value of the region.

The step of correcting the brightness of the to-be-corrected region to obtain the corrected brightness data of the to-be-corrected region according to the regional viewing angle of the to-be-corrected region includes:

obtaining the brightness correction value of the to-be-corrected region from the brightness-corrected-value regional-viewing-angle relational database according to the regional viewing angle of the to-be-corrected region; and obtaining the corrected brightness data of the to-be-corrected region according to the brightness correction value of the to-be-corrected region.

Optionally, in some embodiments of the present application, the region further includes a reference region. The step of establishing the brightness-corrected-value regional-viewing-angle relational database of the mapping relation between the regional viewing angle of the region and a brightness correction value of the region includes:

configuring a shortest distance from the optical center of the lens of the photographing component to the display panel to be a normal work distance;

using the photographing component to photograph the display panel, and obtaining images of the reference region respectively in different regional viewing angles under the preset grayscale;

obtaining brightness correction values and corresponding viewing angles of the images of the reference region respectively in the different regional viewing angles under the preset grayscale, and establishing the brightness-corrected-value regional-viewing-angle relational database of the mapping relation between the brightness correction value of the at least one region and the regional viewing angle.

Optionally, in some embodiments of the present application, the step of obtaining the corrected brightness data of the to-be-corrected region according to the brightness correction value of the to-be-corrected region includes:

obtaining a grayscale value of the to-be-corrected region; and taking the brightness correction value and the grayscale value into a brightness correction formula to obtain the corrected brightness data of the to-be-corrected region; and wherein the brightness correction formula is :

$$Lv(\text{gray},\theta)=((k(\theta)\times n(\text{gray}))/255)^{\gamma}$$

Lv(gray,θ) is the corrected brightness data, k(θ) is the brightness correction value, n(gray))is the grayscale value, and γ is a constant coefficient.

Correspondingly, the present application further provides a brightness compensation device of the display panel. The display panel is divided into at least one region, and the region includes a to-be-corrected region. The brightness compensation device includes:

an image obtaining module, wherein the image obtaining module is configured to use a photographing component to photograph the display panel displaying a preset grayscale image, and to obtain an image of the to-be-corrected region under a preset grayscale;

a brightness obtaining module, wherein the brightness obtaining module is configured to obtain brightness data of the to-be-corrected region through the image of the to-be-corrected region under the preset grayscale;

an included-angle obtaining module, wherein the included-angle obtaining module is configured to obtain a regional viewing angle of the to-be-corrected region, and wherein the regional viewing angle is an included angle between a connection line of an optical center of a lens of the photographing component connecting to a center of the at least one region, and a normal of the display panel;

a correction module, wherein the correction module is configured to correct brightness of the to-be-corrected region to obtain corrected brightness data of the to-be-corrected region according to the regional viewing angle of the to-be-corrected region; and a brightness compensation module, wherein the brightness compensation module is configured to perform brightness compensation on the display panel according to the corrected brightness data of the to-be-corrected region.

Correspondingly, the present application further provides a readable storage medium. A computer program executable on a processor is stored in the readable storage medium, and the processor executes the computer program to realize the steps in the aforesaid brightness compensation method.

Correspondingly, the present application further provides a display device. The display device includes a processor, a memory, and a computer program stored in the memory and executable on the processor, and the processor executes the computer program to realize the steps in the aforesaid brightness compensation method.

The present application provides a brightness compensation method and device of a display panel, a readable storage medium, and a display device. The display panel is divided into at least one region. The region includes a to-be-corrected region. Wherein, the brightness compensation method includes: using a photographing component to photograph the display panel displaying a preset grayscale image; obtaining an image of the to-be-corrected region under a preset grayscale; obtaining brightness data of the to-be-corrected region through the image of the to-be-corrected region under the preset grayscale; obtaining a regional viewing angle of the to-be-corrected region, wherein the regional viewing angle is an included angle between a connection line of an optical center of a lens of the photographing component connecting to a center of the at least one region, and a normal of the display panel; correcting brightness of the to-be-corrected region to obtain corrected brightness data of the to-be-corrected region according to the regional viewing angle of the to-be-corrected region; and performing brightness compensation on the display panel according to the corrected brightness data of the to-be-corrected region. In the present application, brightness of the to-be-corrected region is corrected to obtain corrected brightness data of the to-be-corrected region according to the regional viewing angle of the to-be-corrected region. Then, brightness compensation is performed on the display panel according to the corrected brightness data of the to-be-corrected region. Therefore, the problem that compensation effect is affected due to distortion of image brightness of the display panel incurred by an insufficient working distance of camera is solved.

DESCRIPTION OF DRAWINGS

To more clearly illustrate embodiments or the technical solutions of the present application, the accompanying figures of the present application required for illustrating embodiments or the technical solutions of the present application will be described in brief. Obviously, the accompanying figures described below are only part of the embodiments of the present application, from which figures those skilled in the art can derive further figures without making any inventive efforts.

DETAILED DESCRIPTION OF EMBODIMENTS

The technical solutions in the embodiments of the present application are clearly and completely described in the following with reference to the accompanying drawings in the embodiments of the present application. Obviously, the described embodiments are only part of the embodiments of the present application, but are not all embodiments of the present application. All other embodiments obtained by those skilled in the art based on the embodiments of the present application without creative efforts are within the scope of the present application.

In the description of the present application, it should be understood that the terms "first" and "second" are used for descriptive purposes only and are not to be understood as indicating or implying relative importance or implicitly indicating the number of the indicated technical characteristics. Therefore, the characteristics defined by "first" or "second" may include one or more of the described characteristics either explicitly or implicitly. In the description of the present application, the meaning of "a plurality" is two or more unless clearly and specifically defined otherwise.

The present application provides a brightness compensation method and device of a display panel, a readable storage medium, and a display device. The details are described below. A description order of the following embodiments is not intended to limit a preferred order of the embodiments of the present application.

Figure 1:
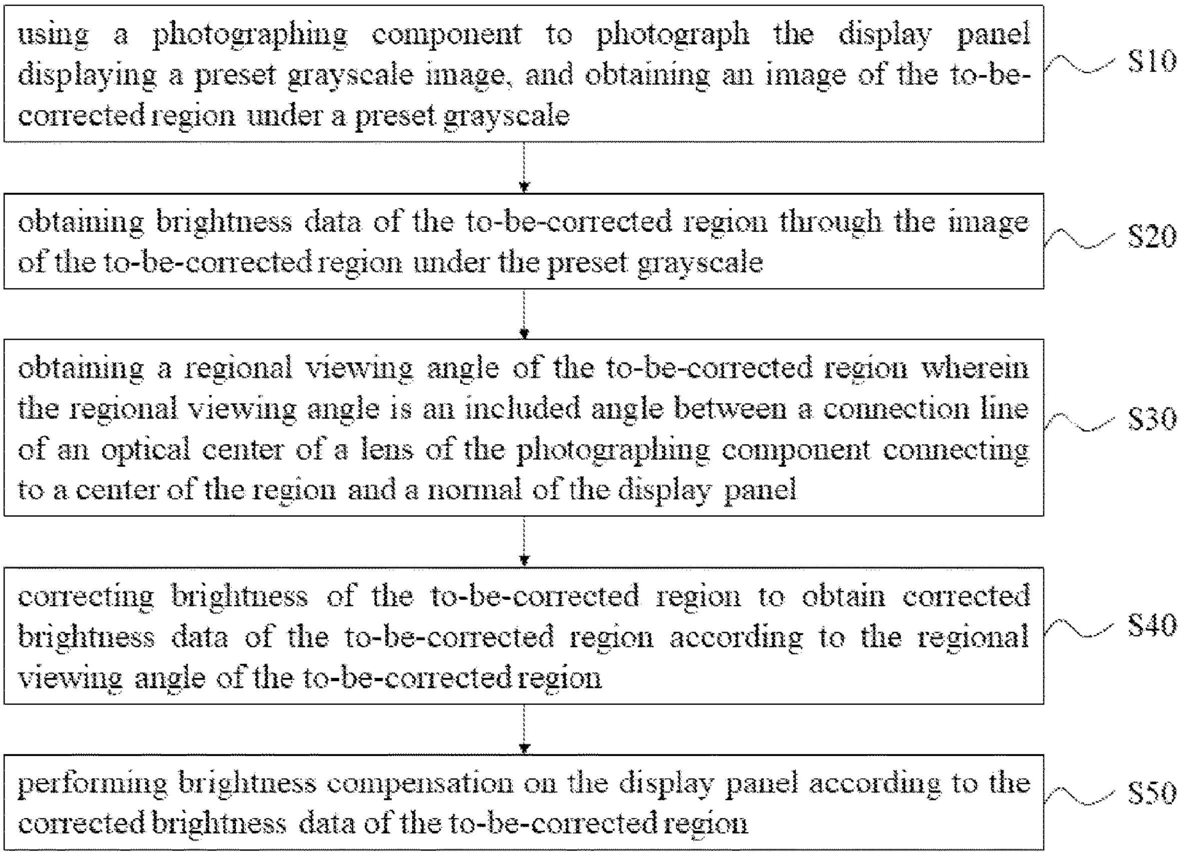
FIG. 1 is a flowchart of a first embodiment of a brightness compensation method provided by the present application.
Figure 2:
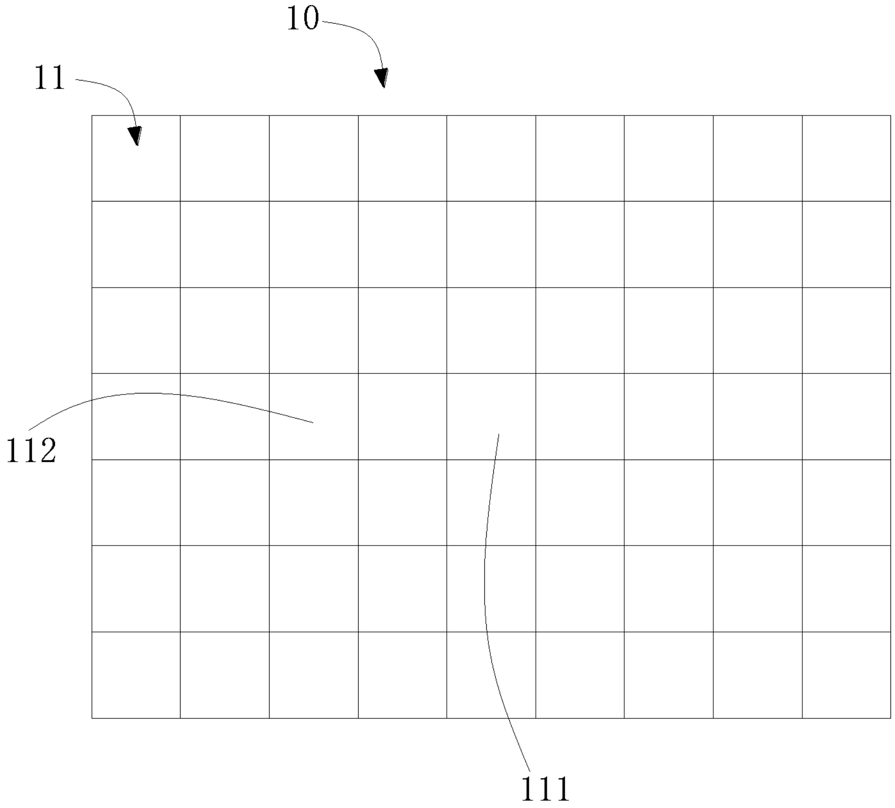
FIG. 2 is a schematic diagram of regions of a display panel of the present application.
Figure 3:
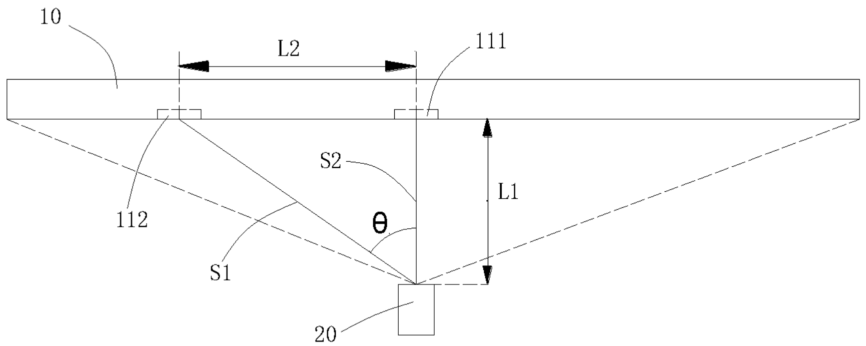
FIG. 3 is a schematic diagram of photographing the display panel through a photographing component in the present application.

Please refer to FIG. 1 to FIG. 3. FIG. 1 is a flowchart of a first embodiment of the brightness compensation method provided by the present application. FIG. 2 is a schematic diagram of regions 11 of a display panel 10 of the present application. FIG. 3 is a schematic diagram of photographing the display panel 10 through a photographing component 20 in the present application. The present application provides a brightness compensation method of a display panel. The display panel 10 is divided into at least one region 11, and the region 11 includes a to-be-corrected region 112. The brightness compensation method includes following steps.

S10: using a photographing component 20 to photograph the display panel 10 displaying a preset grayscale image, and obtaining an image of the to-be-corrected region 112 under a preset grayscale. Wherein, the photographing component 20 can be a photographing device such as a camera, a camera, etc.

Wherein, the shortest distance from the optical center of the lens of the photographing component to the display panel is less than a normal work distance of the photographing component. In this embodiment, the normal work distance of the photographing component is a work distance of a photographing component which ensures that a region in a display panel photographed by the photographing component does not have image distortion or has a minimal image distortion.

S20: obtaining brightness data of the to-be-corrected region 112 through the image of the to-be-corrected region 112 under the preset grayscale. Wherein, the brightness data of the to-be-corrected region 112 can be average brightness in the to-be-corrected region 112 or brightness of a center point of the to-be-corrected region 112.

Specifically, the display panel 10 is divided into a plurality of regions 11, and the region 11 can include a plurality of to-be-corrected regions 112. The brightness data of the display panel 10 collected at this time can cause deviations in actual display brightness of the display panel 10 due to the different viewing angles of the camera components 20 photographing for each region 11 on the display panel 10. For different display grayscales, the deviation at a same position on the panel 10 is also different. Because the photographing component 20 is not located directly in front of the to-be-corrected region 112, the brightness of the to-be-corrected region 112 can be deviated and distorted. Therefore, the brightness of the to-be-corrected region 112 needs to be corrected, thus the problem due to distortion of image brightness of the display panel 10 affecting the compensation effect can be solved.

S30: obtaining a regional viewing angle of the to-be-corrected region 112, wherein the regional viewing angle is an included angle between a connection line of an optical center of a lens of the photographing component 20 connecting to a center of the region 11 and a normal of the display panel 10.

S40: correcting brightness of the to-be-corrected region 112 to obtain corrected brightness data of the to-be-corrected region 112 according to the regional viewing angle of the to-be-corrected region 112.

S50: performing brightness compensation on the display panel 10 according to the corrected brightness data of the to-be-corrected region 112.

In the present application, by correcting the brightness of the to-be-corrected region 112, and then, by performing the brightness compensation on the display panel 10 according to the corrected brightness data of the to-be-corrected region 112, the problem that compensation effect is affected due to distortion of image brightness of the display panel 10 is solved.

Wherein, it should be noted that in the aforesaid processes, the steps S10, S20, S30, S40 and S50 are used to describe the processes of the brightness compensation method of the present application, which are only for easily understanding the processes of the method, but are not a limitation on the specific step sequence of the brightness compensation method of the present application. The brightness compensation method of the present application can also have other step sequences that can achieve the purpose of the invention of the present application, which is not limited herein.

Figure 4:
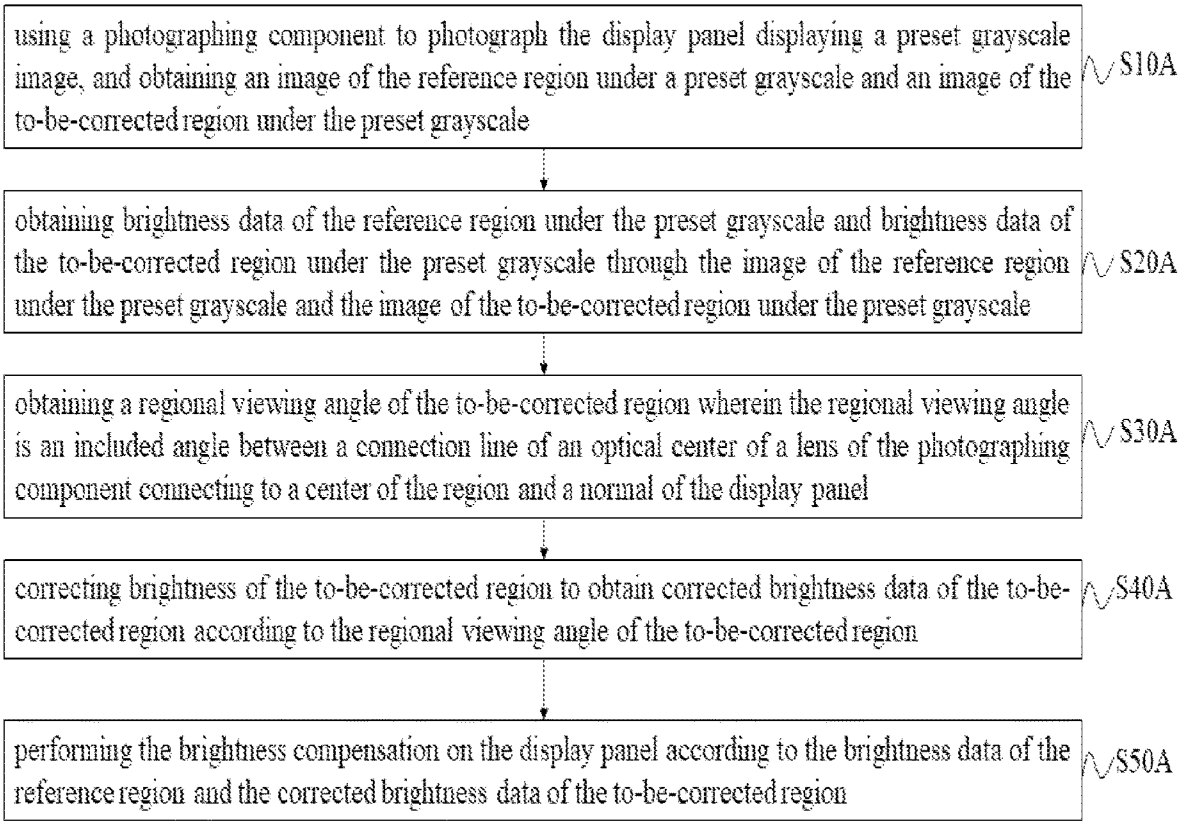
FIG. 4 is a flowchart of a second embodiment of the brightness compensation method provided by the present application.

In some embodiments, please refer to FIG. 3 and FIG. 4. FIG. 4 is a flowchart of a second embodiment of the brightness compensation method provided by the present application. The region 11 includes a reference region 111 and a to-be-corrected region 112. The photographing component 20 is disposed directly in front of the reference region 111. The brightness compensation method includes:

S10A: using a photographing component 20 to photograph the display panel 10 displaying a preset grayscale image, and obtaining an image of the reference region 111 under a preset grayscale and an image of the to-be-corrected region 112 under the preset grayscale. Wherein, a directly front direction is a direction that a connection line of the optical center of the lens of the photographing component connecting to the center of the reference region is perpendicular to the display panel.

S20A: obtaining brightness data of the reference region 111 under the preset grayscale and brightness data of the to-be-corrected region 112 under the preset grayscale through the image of the reference region 111 under the preset grayscale and the image of the to-be-corrected region 112 under the preset grayscale.

S30A: obtaining a regional viewing angle of the to-be-corrected region 112, wherein the regional viewing angle is an included angle between a connection line of an optical center of a lens of the photographing component 20 connecting to a center of the region 11 and a normal of the display panel 10.

S40A: correcting brightness of the to-be-corrected region 112 to obtain corrected brightness data of the to-be-corrected region 112 according to the regional viewing angle of the to-be-corrected region 112.

S50A: performing the brightness compensation on the display panel 10 according to the brightness data of the reference region 111 and the corrected brightness data of the to-be-corrected region 112.

In the present application, the display panel 10 is divided into a plurality of regions 11. One region 11 of the plurality of regions 11 is the reference region 111. Wherein, the reference region 111 can be a central region or a preset non-central region of the display panel 10. The other regions 11 in the plurality of the regions 11 are to-be-corrected regions 112. Wherein, the brightness of the reference region 111 does not need to be corrected. By correcting the brightness of the to-be-corrected region 112, and then, by performing the brightness compensation on the display panel 10 according to the brightness data of the reference region 111 and the corrected brightness data of the to-be-corrected region 112, the problem that compensation effect is affected due to distortion of image brightness of the display panel 10 is solved.

Figure 5:
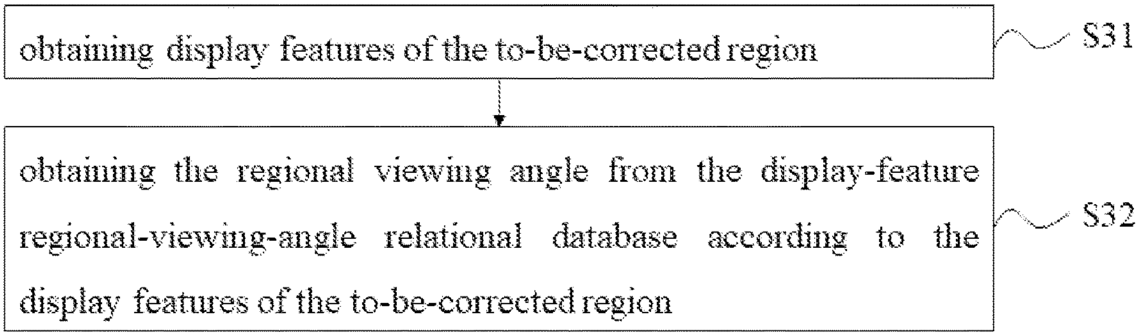
FIG. 5 is a flowchart of the first embodiment of a step S30 of the brightness compensation method provided by the present application.

In some embodiments, please refer to FIG. 5. FIG. 5 is a flowchart of the first embodiment of the step S30 of the brightness compensation method provided by the present application. The brightness compensation method further includes: S60: establishing a display-feature regional-viewing-angle relational database of a mapping relation between display features of the region 11 and the regional viewing angle.

The step S30 includes:

S31: obtaining display features of the to-be-corrected region 112; and

S32: obtaining the regional viewing angle from the display-feature regional-viewing-angle relational database according to the display features of the to-be-corrected region 112.

Figure 6:
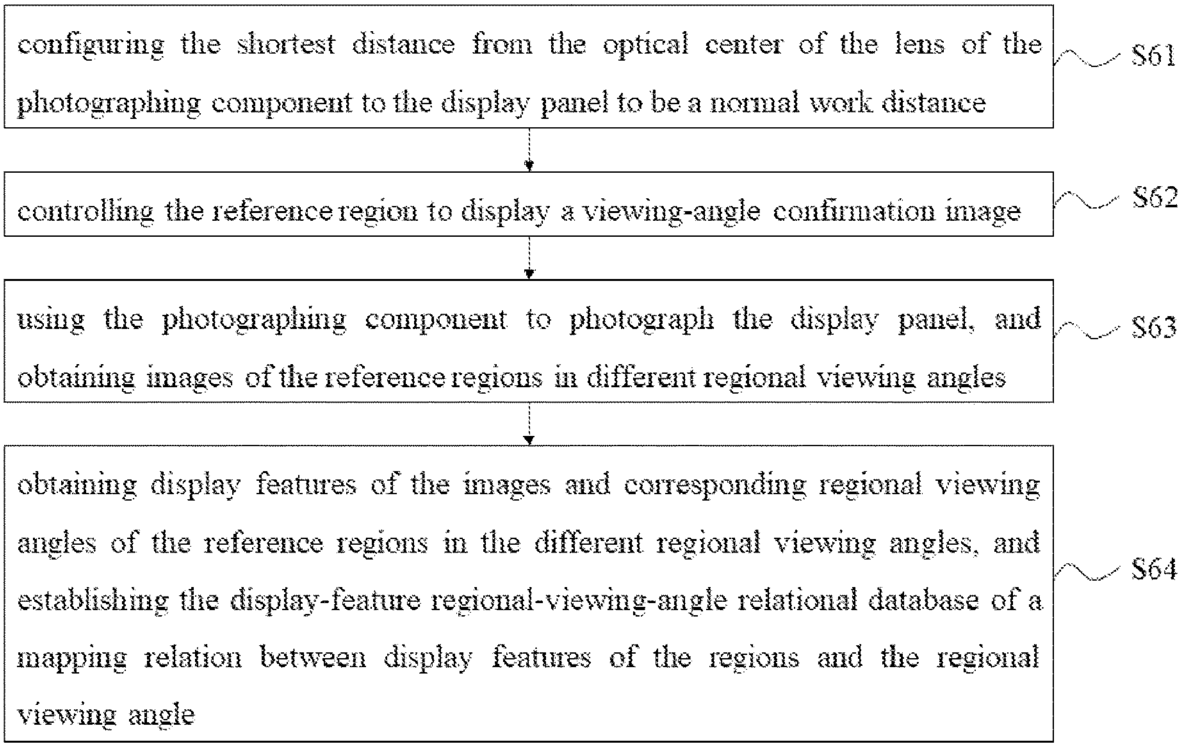
FIG. 6 is a flowchart of a step S60 of the brightness compensation method provided by the present application.

Furthermore, please refer to FIG. 6. FIG. 6 is a flowchart of the step S60 of the brightness compensation method provided by the present application. The regions 11 further include a reference region 111. The step S60 includes:

S61: configuring the shortest distance from the optical center of the lens of the photographing component 20 to the display panel 10 to be a normal work distance, wherein in the normal work distance, a region in the display panel photographed by the photographing component does not have image distortion or has a minimal image distortion.

S62: controlling the reference region 111 to display a viewing-angle confirmation image, wherein the viewing-angle confirmation image can be an image formed by line drawing on edges of each region, or can be a specific image for identifying regional viewing angle. Optionally, centers of the viewing-angle confirmation images overlap with centers of each region.

S63: using the photographing component 20 to photograph the display panel, and obtaining images of the reference regions 111 in different regional viewing angles;

S64: obtaining display features of the images and corresponding regional viewing angles of the reference regions 111 in the different regional viewing angles; and establishing the display-feature regional-viewing-angle relational database of a mapping relation between display features of the regions 11 and the regional viewing angle.

Furthermore, in some embodiments, the step S31 includes:

S311: controlling the reference region 111 to display a viewing-angle confirmation image;

S312: using the photographing component 20 to photograph the display panel, and obtaining an image of the to-be-corrected region 112;

S313: correcting the display features of the to-be-corrected region 112 according to the image of the to-be-corrected region 112.

Figure 7:
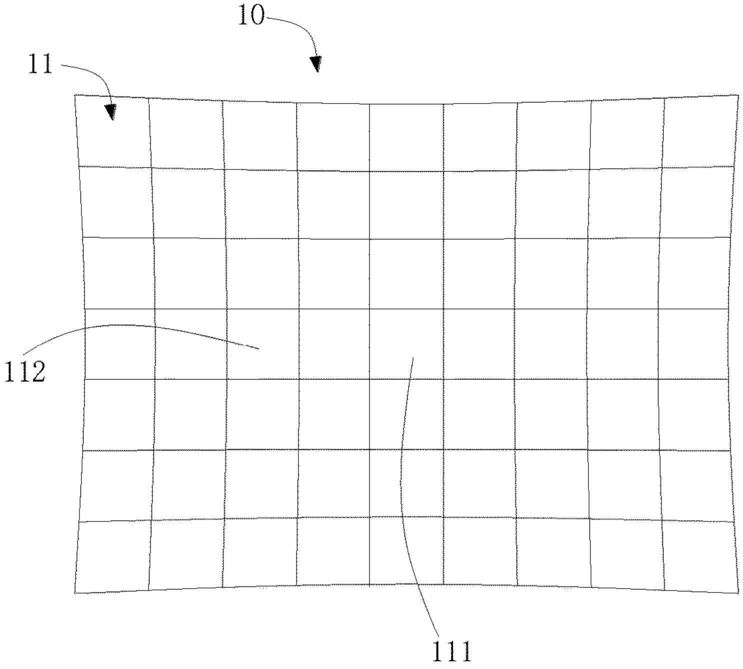
FIG. 7 is a schematic diagram of obtaining an image of the display panel through the photographing component in the present application.
Figure 8:
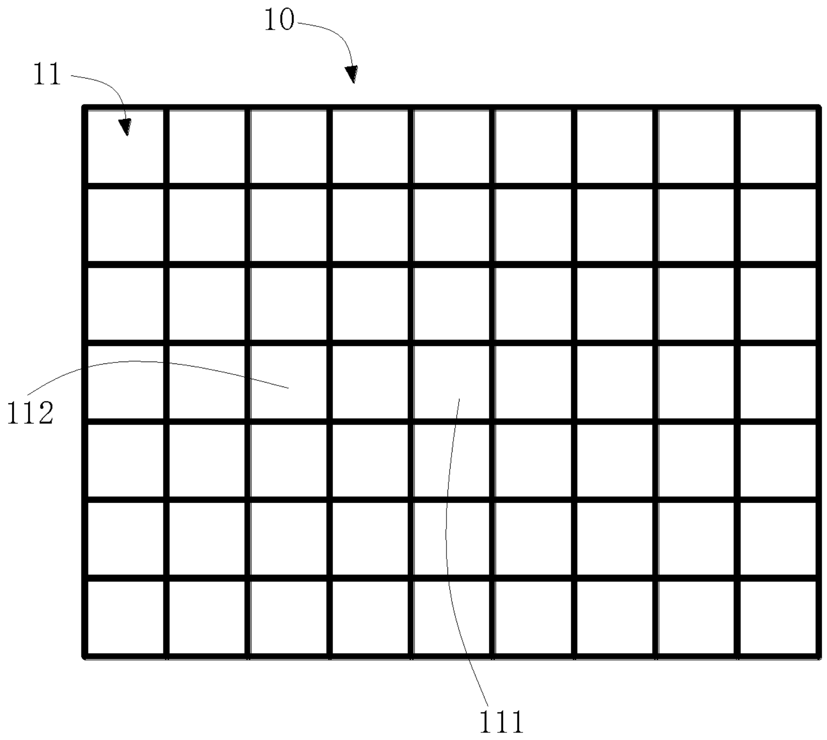
FIG. 8 is a schematic diagram of the regions of the display panel all display viewing-angle confirmation images in the present application.
Figure 9:
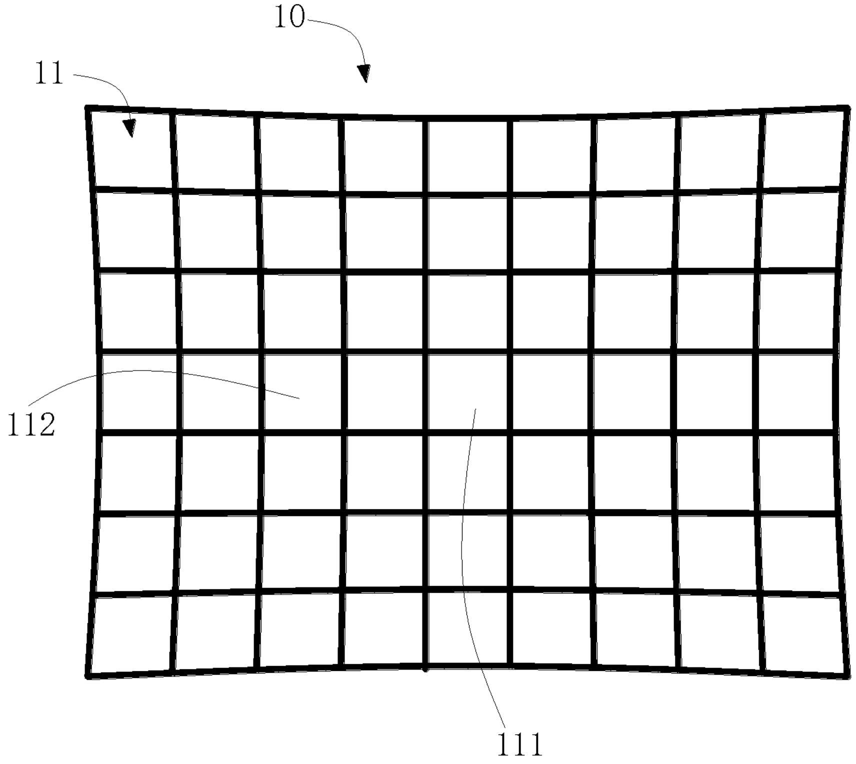
FIG. 9 is a schematic diagram of an image during the regions of the display panel obtained by the photographing component all display the viewing-angle confirmation images in the present application.

Please refer to FIG. 7, FIG. 8, and FIG. 9. FIG. 8 is a schematic diagram of the regions of the display panel all display viewing-angle confirmation images in the present application. FIG. 9 is a schematic diagram of an image during the regions of the display panel obtained by the photographing component all display the viewing-angle confirmation images in the present application. Wherein, the regions 11 are rectangular. In this embodiment, the regions 11 all display viewing-angle confirmation images, and the viewing-angle confirmation images are images formed by line drawing on edges of each region, an initial length of a length side or a width side of a rectangle of the to-be-corrected region 112 under a front view is obtained, a distortion length of a length side or a width side of the to-be-corrected region 112 on the image of the display panel 10 is obtained, and the display features of the to-be-corrected region 112 are obtained according to a ratio of the distortion length to the initial length.

From FIG. 7 and FIG. 9, it can be understood that the image of the display panel 10 obtained by the photographing component 20 must be distorted to a certain extent. Furthermore, as the reference region 111 directly faces to the photographing component 20, the reference region 111 is not distorted, or the extent of the distortion of the reference region 111 is very small and can be ignored. However, the to-be-corrected region 112 has large extent of distortion, which specifically represents that a length of the length side or the width side of the rectangle of the to-be-corrected region 112 is changed under the front viewing angle. Therefore, the display features of the to-be-corrected region 112 can be obtained according to the ratio of the distortion length to the initial length.

Therefore, in some embodiments, specific processes of obtaining the regional viewing angle from the display-feature regional-viewing-angle relational database according to the display features of the to-be-corrected region 112 are as follows:

obtaining the regional viewing angle from the display-feature regional-viewing-angle relational database according to the display features of the to-be-corrected region 112; and if display features same as the display features of the to-be-corrected region 112 are found in the display-feature regional-viewing-angle relational database, then the included angle corresponding to the display features of the to-be-corrected region 112 is obtained. For example, a display feature of one to-be-corrected region is obtained through the step S31, the display feature of the to-be-corrected region is that an aspect ratio of the viewing-angle confirmation image is "a", a regional viewing angle corresponding to "a" in the display-feature regional-viewing-angle relational database is "b", and then, the viewing angle of the to-be-corrected region is confirmed as "b". It can be understood that in other embodiments, the display features include one of or a combination of a plurality of an aspect ratio of the viewing-angle confirmation image, a ratio of a length of the viewing-angle confirmation image in a front viewing angle to a length of the viewing-angle confirmation image in a lateral viewing angle, or a ratio of a width of the viewing-angle confirmation image in the front viewing angle to a width of the viewing-angle confirmation image in the lateral viewing angle.

If a regional viewing angle same as a display feature of the to-be-corrected region 112 is not found in the display-feature regional-viewing-angle relational database, obtaining a first display feature and a first regional viewing angle corresponding to the first display feature, and a second display feature and a second regional viewing angle corresponding to the second display feature, wherein a display feature of the to-be-corrected region 112 is between the first display feature and the second display feature, the first display feature, the first regional viewing angle, the second display feature, and the second regional viewing angle are used to obtain an included angle corresponding to the display feature of the to-be-corrected region 112 according to a linear interpolation method, and wherein the included angle corresponding to the display feature of the to-be-corrected region 112 is the regional viewing angle of the to-be-corrected region 112.

For example, the first display feature is X1, the first regional viewing angle is Y1, the second display feature is X2, and the second regional viewing angle is Y2, and the display feature of the to-be-corrected region 112 is X, and then the included angle Y corresponding to the display feature of the to-be-corrected region 112 is $Y=X(Y1+Y2)/((X1+X2))$.

Figure 10:
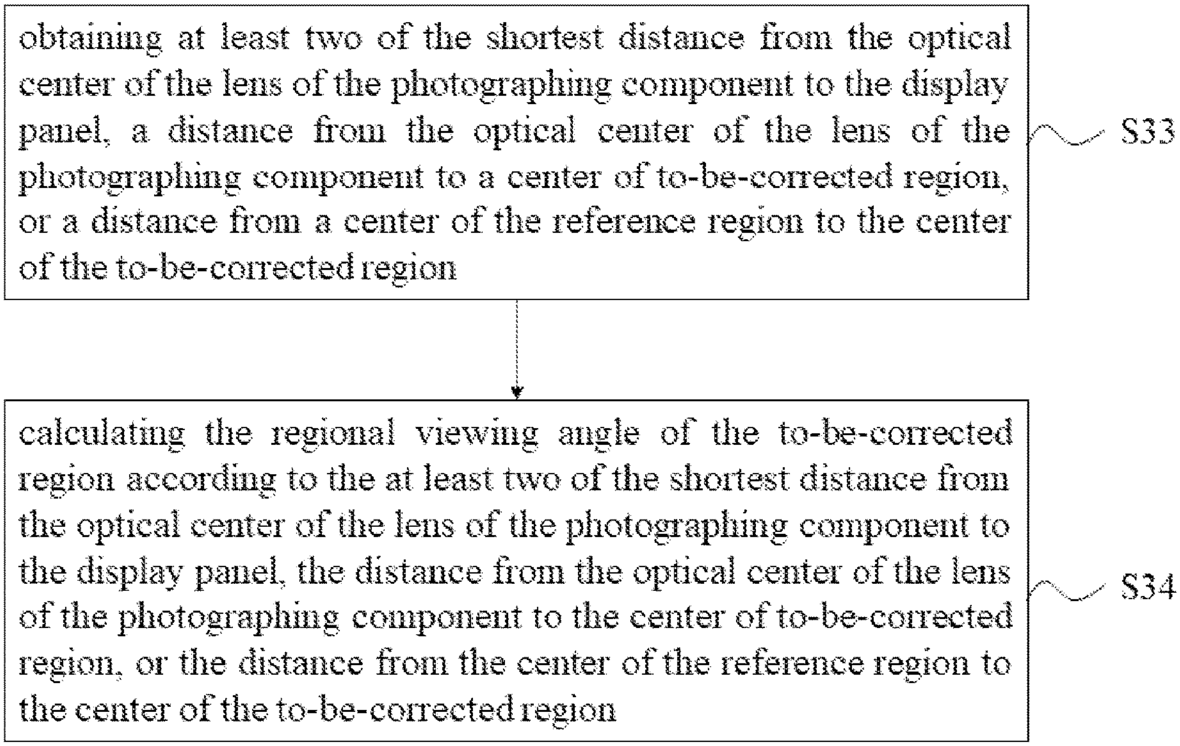
FIG. 10 is a flowchart of the second embodiment of the step S30 of the brightness compensation method provided by the present application.

In some embodiments, please refer to FIG. 10. FIG. 10 is a flowchart of the second embodiment of the step S30 of the brightness compensation method provided by the present application. The regions further include a reference region, and the photographing component is disposed directly in front of the reference region. The step S30 includes:

S33: obtaining at least two of the shortest distance from the optical center of the lens of the photographing component 20 to the display panel 10, a distance from the optical center of the lens of the photographing component 20 to a center of to-be-corrected region 112, or a distance from a center of the reference region 111 to the center of the to-be-corrected region 112; and S34: calculating the regional viewing angle of the to-be-corrected region 112 according to the at least two of the shortest distance from the optical center of the lens of the photographing component 20 to the display panel 10, the distance from the optical center of the lens of the photographing component 20 to the center of to-be-corrected region 112, or the distance from the center of the reference region 111 to the center of the to-be-corrected region 112.

Specifically, in some embodiments, the step S30 includes:

obtaining the shortest distance L1 of the optical center of the lens of the photographing component 20 to the display panel 10 and the distance L2 of the optical center of the lens of the photographing component 20 to the center of to-be-corrected region 112;

using an inverse trigonometric function to obtain an included angle, i.e. the regional viewing angle of the to-be-corrected region 112, between the connection line S1 of the optical center of the lens of the photographing component 20 connecting to the center of the to-be-corrected region 112 and the normal S2 of the display panel 10 according to the shortest distance from the optical center of the lens of the photographing component 20 to the display panel 10 and the distance from the optical center of the lens of the photographing component 20 to the center of to-be-corrected region 112.

When the optical center of the lens of the photographing component 20 is perpendicular to the display panel 10, the distance from the optical center of the lens of the photographing component 20 to the display panel 10 is the shortest. Then, the included angle θ between the connection line of the optical center of the lens of the photographing component 20 connecting to the center of the to-be-corrected region 112 and the normal S2 of the display panel 10 is: $\theta=\cos^{-1}(L2/L1)$.

Figure 11:
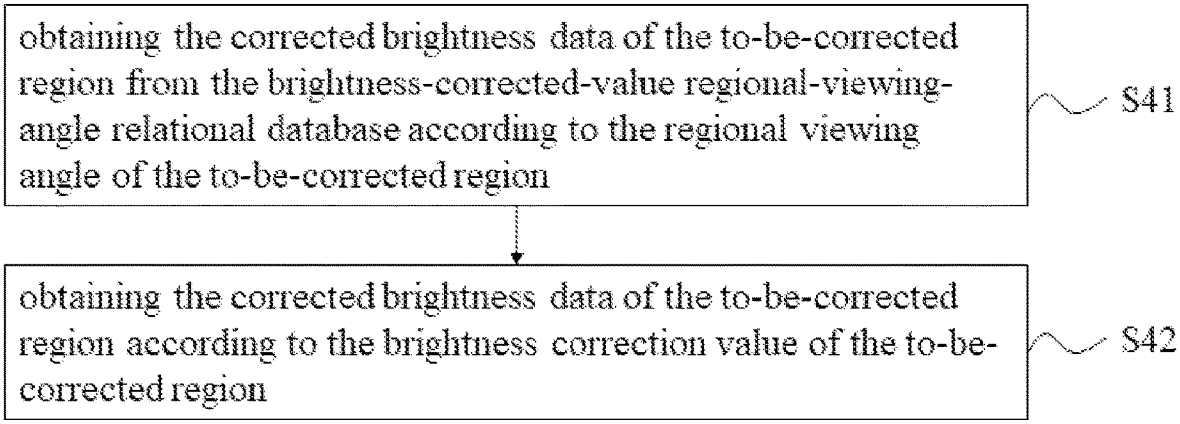
FIG. 11 is a flowchart of a step S40 of the brightness compensation method provided by the present application.

In some embodiments, please refer to FIG. 11. FIG. 11 is a flowchart of a step S40 of the brightness compensation method provided by the present application. The brightness compensation method further includes:

S70: establishing a brightness-corrected-value regional-viewing-angle relational database of a mapping relation between the regional viewing angle of the region 11 and a brightness correction value of the region 11.

The step S40 includes:

S41: obtaining the corrected brightness data of the to-be-corrected region from the brightness-corrected-value regional-viewing-angle relational database according to the regional viewing angle of the to-be-corrected region 112.

S42: obtaining the corrected brightness data of the to-be-corrected region 112 according to the brightness correction value of the to-be-corrected region 112.

In some embodiments of the present application, the brightness correction value of the to-be-corrected region 112 is a target brightness value, i.e., the brightness correction value is the brightness of the to-be-corrected region 112 under a front-view condition, which is recorded as front view brightness. At this time, the corrected brightness data of the to-be-corrected region 112 is the brightness correction value of the to-be-corrected region 112.

In some embodiments of the present application, the brightness correction value of the to-be-corrected region 112 is a brightness difference between the target brightness value and an original brightness value. Wherein, the target brightness value is the brightness data of the reference region under the front-view condition, and the brightness original value is the brightness data of the to-be-corrected region 112 obtained in the step S20. At this time, the corrected brightness data of the to-be-corrected region 112 is a sum of the brightness data of the to-be-corrected region 112 and the brightness correction value of the to-be-corrected region 112.

In some embodiments of the present application, the brightness correction value of the to-be-corrected region 112 is a brightness ratio of the target brightness value to the original brightness value. Wherein, the target brightness value is the brightness data of the reference region under the front-view condition, and the brightness original value is the brightness data of the to-be-corrected region 112 obtained in the step S20. At this time, the corrected brightness data of the to-be-corrected region 112 is a product value of the brightness data of the to-be-corrected region 112 and the brightness correction value of the to-be-corrected region 112.

Figure 12:
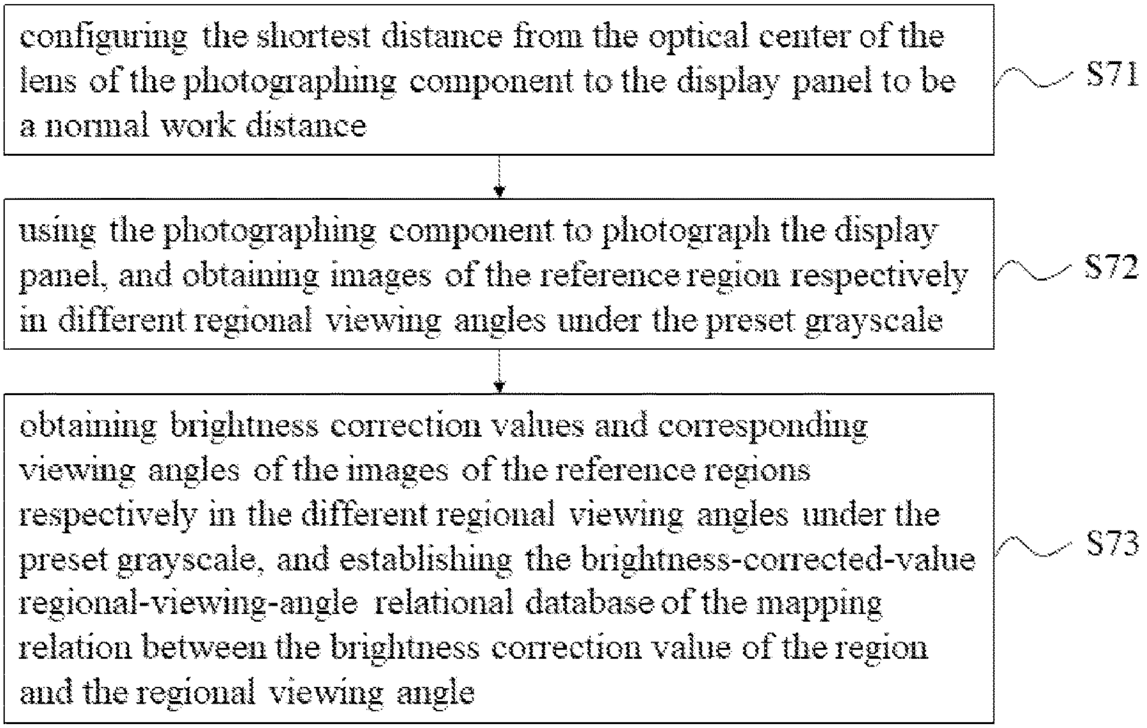
FIG. 12 is a flowchart of a step S70 of the brightness compensation method provided by the present application.

It can be understood that in other embodiments, the brightness correction value of the to-be-corrected region 112 can be other parameters sufficient to express the relation between the original brightness value and the target brightness value, i.e., satisfying the target brightness value can be obtained according to the brightness correction value. In some embodiments, please refer to FIG. 12. FIG. 12 is a flowchart of a step S70 of the brightness compensation method provided by the present application. The regions 11 further includes a reference region 111. The step S70 includes:

S71: configuring the shortest distance from the optical center of the lens of the photographing component 20 to the display panel 10 to be a normal work distance, wherein in the normal work distance, a region in the display panel photographed by the photographing component does not have image distortion or has a minimal image distortion.

S72: using the photographing component 20 to photograph the display panel 10, and obtaining images of the reference region 111 respectively in different regional viewing angles under the preset grayscale;

S73: obtaining brightness correction values and corresponding viewing angles of the images of the reference regions 111 respectively in the different regional viewing angles under the preset grayscale, and establishing the brightness-corrected-value regional-viewing-angle relational database of the mapping relation between the brightness correction value of the region 11 and the regional viewing angle.

Wherein, in one embodiment, the brightness correction value of the to-be-corrected region 112 is a brightness ratio of the target brightness value to the original brightness value, and the brightness-corrected-value regional-viewing-angle relational database of the mapping relation between the brightness correction value of the region 11 and the regional viewing angle are shown in the following table:

| Brightness correction value | Included angle | Grayscale value | | | | |
|---|---|---|---|---|---|---|
| | | Gray_0 | Gray_1 | . . . | Gray_254 | Gray_255 |
| K(θ) | 0° | 1 | 1 | . . . | 1 | 1 |
| | 30° | 5.102040816 | 6.460093897 | . . . | 0.631087558 | 0.632430671 |
| | 45° | 5.760204082 | 7.790610329 | | 0.332061691 | 0.333768692 |
| | 60° | 5.360204082 | 7.378403756 | . . . | 0.186218597 | 0.187691212 |

Figure 13:
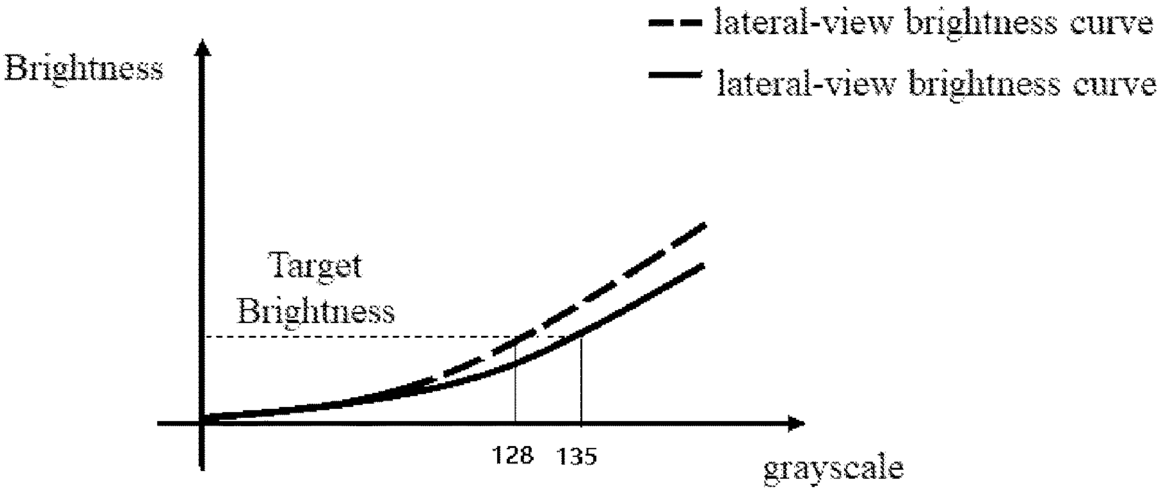
FIG. 13 is a comparison schematic diagram of a lateral-view brightness curve and a front-view brightness curve of the region of the display panel.

Please refer to FIG. 13. FIG. 13 is a comparison schematic diagram of a lateral-view brightness curve and a front-view brightness curve of the region of the display panel 10. From FIG. 13, it can be understood that when the image of the region 11 of the display panel 10 is obtained from a lateral viewing angle, there is a deviation in the brightness of the region 11 of the display panel 10 obtained from the image of the region 11 of the display panel Specifically, when the included angle between the connection line of the optical center of the lens of the photographing component 20 and the center of the region 11 and the normal S2 of the display panel 10 is θ, the brightness of the region 11 obtained according to the image of the area region is a brightness of 128 grayscale. However, the front-view brightness of the region 11 is a brightness of 135 grayscale. At this time, the included angle θ between the connection line of the optical center of the lens of the photographing component connecting to the center of the region 11 and the normal S2 of the display panel 10 is a difference value of the brightness of 135 grayscale and the brightness of 128 grayscale.

Correspondingly, when the brightness correction value of the to-be-corrected region 112 is the target brightness value, i.e., the brightness correction value being the front view brightness, which is the brightness of 135 grayscale, taking the aforesaid example as an example, the brightness correction value of the to-be-corrected region 112 at the regional viewing angle θ is the brightness of 135 grayscale.

When the brightness correction value of the to-be-corrected region 112 is the brightness difference between the target brightness value and the original brightness value, taking the aforesaid example as an example, the brightness correction value of the to-be-corrected region 112 is a difference between the brightness of 135 grayscale and the brightness of 128 grayscale.

When the brightness correction value of the to-be-corrected region 112 is the brightness ratio of the target brightness value to the original brightness value, taking the aforesaid example as an example, the brightness correction value of the to-be-corrected region 112 is a ratio of the brightness of 135 grayscale to the brightness of 128 grayscale.

Figure 14:
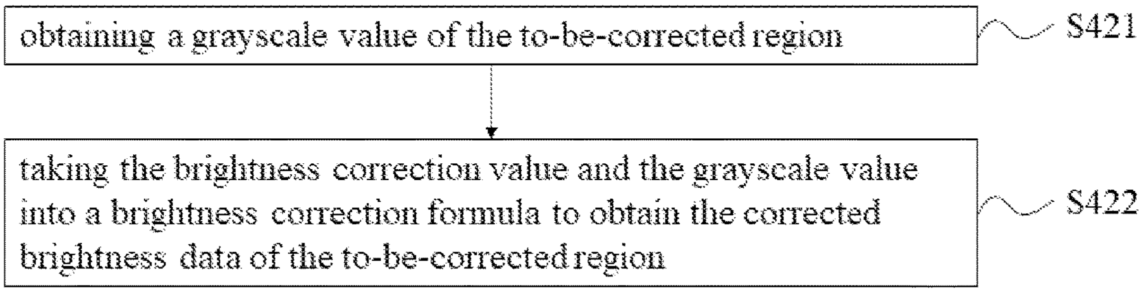
FIG. 14 is a flowchart of a step S42 of the brightness compensation method provided by the present application.

In some embodiments, please refer to FIG. 14. FIG. 14 is a flowchart of a step S42 of the brightness compensation method provided by the present application. The step S42 includes:

S421: obtaining a grayscale value of the to-be-corrected region 112;

S422: taking the brightness correction value and the grayscale value into a brightness correction formula to obtain the corrected brightness data of the to-be-corrected region 122; and wherein the brightness correction formula is:

$$Lv(\text{gray},\theta)=((k(\theta)\times n(\text{gray}))/255)^{\gamma}$$

Lv(gray,θ) is the corrected brightness data, k(θ) is the brightness correction value, n(gray) is a grayscale value, and γ is a constant coefficient. Wherein a value of γ can be 2.2

Wherein, the step of obtaining the corrected brightness data of the to-be-corrected region 112 from the brightness-corrected-value regional-viewing-angle relational database according to the regional viewing angle of the to-be-corrected region 112 includes:

searching a corresponding included angle from the brightness-corrected-value regional-viewing-angle relational database according to the regional viewing angle of the to-be-corrected region 112;

if an included angle same as the regional viewing angle of the to-be-corrected region 112 is searched from the brightness-corrected-value regional-viewing-angle relational database, then a brightness correction value corresponding to the regional viewing angle of the to-be-corrected region 112 is obtained;

if the included angle same as the regional viewing angle of the to-be-corrected region 112 is not searched from the brightness-corrected-value regional-viewing-angle relational database, then, obtaining a first brightness correction value and a first regional viewing angle corresponding to the first brightness correction value, and a second brightness correction value and a second regional viewing angle corresponding to the second brightness correction value, wherein the regional viewing angle of the to-be-corrected region 112 is between the first regional viewing angle and the second regional viewing angle, and using the first brightness correction value, the first regional viewing angle, the second brightness correction value, and the second regional viewing angle to obtain the brightness correction value corresponding to the regional viewing angle of the to-be-corrected region 112 according to the linear interpolation method.

For example, the first brightness correction value is K1, the first regional viewing angle is Y1, the second brightness correction value is K2, the second regional viewing angle is Y2, the regional viewing angle of the to-be-corrected region 112 is Y, and the brightness correction value K corresponding to the regional viewing angle of the to-be-corrected region 112 is K=Y(K1+K2)/((Y1+Y2)).

Figure 15:
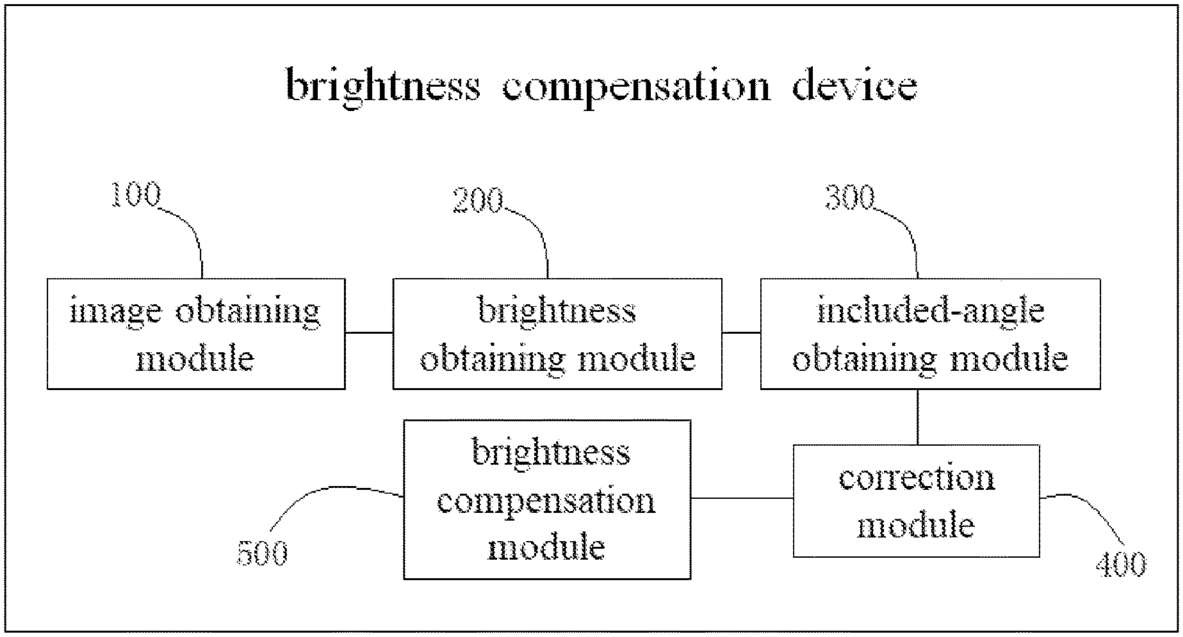
FIG. 15 is a schematic diagram of the brightness compensation device provided by the present application.

Please refer to FIG. 15. FIG. 15 is a schematic diagram of the brightness compensation device provided by the present application. One embodiment of the present application further provides a brightness compensation device of the display panel. The display panel 10 is divided into at least one region 11, and the region 11 includes a to-be-corrected region 112. The brightness compensation device includes an image obtaining module 100, a brightness obtaining module 200, an included-angle obtaining module 300, a correction module 400, and a brightness compensation module 500.

Wherein, the image obtaining module 100 is configured to use a photographing component 20 to photograph the display panel 10 displaying a preset grayscale image and to obtain an image of the to-be-corrected region 112 under a preset grayscale. The brightness obtaining module 200 is configured to obtain brightness data of the to-be-corrected region 112 through the image of the to-be-corrected region 112 under the preset grayscale. The included-angle obtaining module 300 is configured to obtain a regional viewing angle of the to-be-corrected region 112, and wherein the regional viewing angle is an included angle between a connection line of an optical center of a lens of the photographing component 20 connecting to a center of the region 11 and a normal of the display panel 10. The correction module 400 is configured to correct brightness of the to-be-corrected region 112 to obtain corrected brightness data of the to-be-corrected region 112 according to the regional viewing angle of the to-be-corrected region 112. The brightness compensation module 500 is configured to perform brightness compensation on the display panel 10 according to the corrected brightness data of the to-be-corrected region 112.

One embodiment of the present application further provides a readable storage medium. A computer program executable on a processor is stored in the readable storage medium, and the processor executes the computer program to realize the steps in the aforesaid brightness compensation method. Preferably, the readable storage medium can include computer readable storage medium such as a non-volatile memory or a non-transitory memory. The storage medium can include but is not limited to a read only memory (ROM), a random access memory (RAM), a magnetic disk, or a disc, etc.

One embodiment of the present application further provides a display device. The display device includes a processor, a memory, and a computer program stored in the memory and executable on the processor. The processor executes the computer program to realize the steps in the aforesaid brightness compensation method.

Specifically, in one embodiment of the present application, the processor can be a central processing unit (CPU). The processor can be another universal processor, a digital signal processor (DSP), an application-specific integrated circuit (ASIC), a field-programmable gate array (FPGA) or another programmable logic device, a discrete gate or a transistor logic device, a discrete hardware assembly, etc.

The universal processor can be a microprocessor, or the processor may be any conventional processor, etc.

It should also be understood that the memory in the embodiments of the present application can be a volatile memory or a nonvolatile memory, or can include both the volatile memory and the nonvolatile memory. Wherein, the non-volatile memory can be a read-only memory (ROM), a programmable read-only memory (PROM), an erasable programmable read-only memory (EPROM), an electrically erasable programmable read-only memory (EEPROM), or a flash memory.

The volatile memory can be a random access memory (RAM), and is used as an external cache. By way of example instead of limitation, RAMs of many forms can be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), or a direct rambus random access memory (DRRAM).

The above describes the brightness compensation method and device of the display panel, the readable storage medium, and the display device provided by the embodiments of the present application in detail. This article uses specific cases for describing the principles and the embodiments of the present application, and the description of the embodiments mentioned above is only for helping to understand the method and the core idea of the present application. Meanwhile, for those skilled in the art, will have various changes in specific embodiments and application scopes according to the idea of the present application. In summary, the content of the specification should not be understood as limit to the present application.

What is claimed is:

1. A brightness compensation method of a display panel, wherein the display panel is divided into at least one region, the at least one region comprises a to-be-corrected region and a reference region, and the brightness compensation method comprises:

using a photographing component, disposed directly in front of the reference region, to photograph the display panel displaying a preset grayscale image, obtaining an image of the to-be-corrected region under a preset grayscale;

obtaining brightness data of the to-be-corrected region through the image of the to-be-corrected region under the preset grayscale;

obtaining at least two of a shortest distance from the optical center of the lens of the photographing component to the display panel, a distance from the optical center of the lens of the photographing component to a center of the to-be-corrected region, or a distance from a center of the reference region to the center of the to-be-corrected region;

calculating a regional viewing angle of the to-be-corrected region according to the at least two of the shortest distance from the optical center of the lens of the photographing component to the display panel, the distance from the optical center of the lens of the photographing component to the center of to-be-corrected region, or the distance from the center of the reference region to the center of the to-be-corrected region, wherein the regional viewing angle is an included angle between a connection line of an optical center of a lens of the photographing component connecting to a center of the at least one region, and a normal of the display panel;

correcting brightness of the to-be-corrected region to obtain corrected brightness data of the to-be-corrected region according to the regional viewing angle of the to-be-corrected region; and performing brightness compensation on the display panel according to the corrected brightness data of the to-be-corrected region.

2. The brightness compensation method as claimed in claim 1, wherein the shortest distance from the optical center of the lens of the photographing component to the display panel is less than a normal work distance of the photographing component.

3. The brightness compensation method as claimed in claim 1, wherein the brightness compensation method comprises:

obtaining an image of the reference region under the preset grayscale; and obtaining brightness data of the reference region through the image of the reference region under the preset grayscale; and wherein performing the brightness compensation on the display panel according to the corrected brightness data of the to-be-corrected region comprises:

performing the brightness compensation on the display panel according to the brightness data of the reference region and the corrected brightness data of the to-be-corrected region.

4. The brightness compensation method as claimed in claim 1, wherein the brightness compensation method comprises:

establishing a display-feature regional-viewing-angle relational database of a mapping relation between display features of the at least one region and the regional viewing angle; and wherein obtaining the regional viewing angle of the to-be-corrected region comprises:

obtaining display features of the to-be-corrected region; and obtaining the regional viewing angle from the display-feature regional-viewing-angle relational database according to the display features of the to-be-corrected region.

5. The brightness compensation method as claimed in claim 4, wherein establishing the display-feature regional-viewing-angle relational database of the mapping relation between display features of the at least one region and the regional viewing angle comprises:

configuring the shortest distance from the optical center of the lens of the photographing component to the display panel to be a normal work distance;

controlling the reference region to display a viewing-angle confirmation image;

using the photographing component to photograph the display panel, and obtaining images of reference regions in different regional viewing angles;

obtaining display features and corresponding regional viewing angles of the images of the reference regions in the different regional viewing angles to establish the display-feature regional-viewing-angle relational database.

6. The brightness compensation method as claimed in claim 1, wherein the brightness compensation method comprises:

establishing a brightness-corrected-value regional-viewing-angle relational database of a mapping relation between the regional viewing angle of the at least one region and a brightness correction value of the at least one region; and wherein correcting the brightness of the to-be-corrected region to obtain the corrected brightness data of the to-be-corrected region according to the regional viewing angle of the to-be-corrected region comprises:

obtaining a brightness correction value of the to-be-corrected region from the brightness-corrected-value regional-viewing-angle relational database according to the regional viewing angle of the to-be-corrected region; and obtaining the corrected brightness data of the to-be-corrected region according to the brightness correction value of the to-be-corrected region.

7. The brightness compensation method as claimed in claim 6, wherein establishing the brightness-corrected-value regional-viewing-angle relational database of the mapping relation between the regional viewing angle of the at least one region and the brightness correction value of the at least one region comprises:

configuring a shortest distance from the optical center of the lens of the photographing component to the display panel to be a normal work distance;

using the photographing component to photograph the display panel, and obtaining images of reference regions respectively in different regional viewing angles under the preset grayscale;

obtaining brightness correction values and corresponding viewing angles of the images of the reference regions respectively in the different regional viewing angles under the preset grayscale to establish the brightness-corrected-value regional-viewing-angle relational database.

8. The brightness compensation method as claimed in claim 7, wherein obtaining the corrected brightness data of the to-be-corrected region according to the brightness correction value of the to-be-corrected region comprises:

obtaining a grayscale value of the to-be-corrected region; and taking the brightness correction value and the grayscale value into a brightness correction formula to obtain the corrected brightness data of the to-be-corrected region; and wherein the brightness correction formula is:

$$Lv(\text{gray},\theta)=((k(\theta)\times n(\text{gray}))/255)^{\gamma}$$

Lv(gray,θ) is the corrected brightness data, k(θ) is the brightness correction value, n(gray) is the grayscale value, and γ is a constant coefficient.

9. A non-transitory readable storage medium, wherein a computer program executable on a processor is stored in the readable storage medium, and the processor executes the computer program to realize steps in the brightness compensation method of as claimed in claim 1.

10. A display device, comprising a processor, a memory, and a computer program stored in the memory and executable on the processor, wherein the processor executes the computer program to realize steps in the brightness compensation method as claimed in claim 1.

* * * * *